US011403578B2

(12) United States Patent
Cole et al.

(10) Patent No.: US 11,403,578 B2
(45) Date of Patent: Aug. 2, 2022

(54) MULTI-TASK DEEP LEARNING OF HEALTH CARE OUTCOMES

(71) Applicant: ADP, Inc., Roseland, NJ (US)

(72) Inventors: Ramsay Cole, Brooklyn, NY (US); Kurt Newman, Columbus, GA (US)

(73) Assignee: ADP, Inc., Roselane, NJ (US)

( * ) Notice: Subject to any disclaimer, the term of this patent is extended or adjusted under 35 U.S.C. 154(b) by 0 days.

(21) Appl. No.: 16/922,801

(22) Filed: Jul. 7, 2020

(65) Prior Publication Data
US 2022/0012664 A1 Jan. 13, 2022

(51) Int. Cl.
| | | |
|---|---|---|
| *G06Q 10/06* | (2012.01) | |
| *G06Q 10/10* | (2012.01) | |
| *G06N 7/00* | (2006.01) | |
| *G06Q 30/02* | (2012.01) | |
| *G06N 3/08* | (2006.01) | |

(52) U.S. Cl.
CPC ......... *G06Q 10/06375* (2013.01); *G06N 3/08* (2013.01); *G06N 7/005* (2013.01); *G06Q 10/067* (2013.01); *G06Q 10/06315* (2013.01); *G06Q 10/1057* (2013.01); *G06Q 30/0204* (2013.01)

(58) Field of Classification Search
CPC ......... G06Q 10/06375; G06Q 30/0204; G06Q 10/067; G06Q 10/1057; G06Q 10/06315; G06N 7/005; G06N 3/08
See application file for complete search history.

(56) References Cited

U.S. PATENT DOCUMENTS

| | | | | |
|---|---|---|---|---|
| 10,611,026 B1 * | 4/2020 | Sun | ....................... | B25J 9/1664 |
| 2017/0134590 A1 * | 5/2017 | Mathison | ............. | H04M 15/66 |
| 2017/0185723 A1 * | 6/2017 | McCallum | ............. | G06Q 10/10 |
| 2018/0285343 A1 * | 10/2018 | Chen | ....................... | G06F 40/30 |
| 2018/0349942 A1 * | 12/2018 | Mu | ..................... | G06Q 30/0242 |

(Continued)

FOREIGN PATENT DOCUMENTS

WO   WO-2019227071 A   * 11/2019   .......... G06F 11/3024

OTHER PUBLICATIONS

PSA Union; Covid-19—Together we will get through; PSA Website; Mar. 18, 2020; p. 1-4; retrieved from https://www.psa.org.nz/assets/Uploads/18-March-2020-CPS-Member-Update-Coronavirus.pdf (Year: 2020).*

*Primary Examiner* — Mehmet Yesildag
*Assistant Examiner* — Jeremy L Gunn
(74) *Attorney, Agent, or Firm* — Yee & Associates, P.C.

(57) ABSTRACT

A method for generating a communicable disease policy plan by using machine learning. The process identifies a number of workplace policies for a number of business entities. The workplace policies comprise a number of dimensions of data collected from a number of sources. The process collects employment data for each of the business entities. The employment data includes sick leave data about employees of the plurality of business entities. The process determines metrics for the sick leave data during a given time interval; simultaneously models the workplace policies and the metrics for the sick leave data to identify correlations among the number of dimensions of data and generalize rules for predicting effective workplace policies; predicts a number of effective workplace policies for a particular business entity; and generates a communicable disease policy plan for the particular business entity based on the number of effective workplace policies.

18 Claims, 8 Drawing Sheets

(56) References Cited

U.S. PATENT DOCUMENTS

| | | | | |
|---|---|---|---|---|
| 2019/0362249 A1* | 11/2019 | Rogynskyy | ....... | G06F 16/24575 |
| 2020/0013017 A1* | 1/2020 | Dias | ....... | G06N 7/005 |
| 2020/0200416 A1* | 6/2020 | Granger | ....... | F24F 11/30 |
| 2020/0234216 A1* | 7/2020 | Newman | ....... | G06Q 10/105 |
| 2021/0117923 A1* | 4/2021 | Gray | ....... | G06F 16/2465 |

* cited by examiner

MULTI-TASK DEEP LEARNING OF HEALTH CARE OUTCOMES

BACKGROUND INFORMATION

1. Field

The present disclosure relates generally to an improved computer system and, in particular, to deep machine learning regarding policies designed to address communicable diseases and predicting the most effective policies.

2. Background

Major chaotic events are, by definition, times of great difficulty. Chaotic events are events that cause an interruption in routines normally performed by people in everyday activities because of damage inflicted to individuals and infrastructure. For example, there is great potential for episodes of profound chaos during hurricanes, earthquakes, tidal waves, solar flares, flooding, terrorism, war, and pandemics to name a few. Even when the chaotic event is statistically predictable, the results are often still shocking. Chaotic events do not occur frequently, but the results may be long lasting and unexpected.

Human beings, by nature, are generally very ill prepared at a mental level for planning for and dealing with these chaotic events. Leaders and other planners tend to only concentrate on a small number of obvious situations. Additionally, various chaotic events are difficult to plan for because of how rarely they occur and because of the unknowable. The unknowable effects may include the severity and geographic range of the affected area and the reaction to the event.

Additionally, the presentation of data to decision makers during a chaotic effect can have a major impact on the effectiveness of any policies designed to ameliorate the event. For example, during chaotic events, a business entity can have great difficulty making optimal decisions, from a mathematically verifiable perspective. These problems may be further compounded when different decisions are made by multiple business entities, each having a cumulative effect on the general public.

Thus, there may be many considerations for the employer to take into account when designing policies for its employees. However, accessing the information needed to make a well-informed selection, as well as determining the most effective policies, may be more tedious, difficult, and time-consuming than desired.

SUMMARY

An illustrative embodiment provides a computer-implemented method for generating an communicable disease policy plan by using machine learning. The process identifies a number of workplace policies for a number of business entities. The workplace policies comprise a number of dimensions of data collected from a number of sources. The process collects employment data for each of the business entities. The employment data includes sick leave data about employees of the plurality of business entities. The process determines metrics for the sick leave data during a given time interval. The process simultaneously models the workplace policies and the metrics for the sick leave data to identify correlations among the number of dimensions of data and generalize rules for predicting effective workplace policies. The process predicts, according to the modeling, a number of effective workplace policies for a particular business entity based on the employment data of the particular business entity. The process generates the generating a communicable disease policy plan for the particular business entity based on the number of effective workplace policies.

Another illustrative embodiment provides a system for generating an employee benefit plan. The system comprises a bus system, a storage device connected to the bus system, wherein the storage device stores program instructions, and a number of processors connected to the bus system, wherein the number of processors execute the program instructions: to collect employment data for each of the business entities, the employment data including sick leave data about employees of the plurality of business entities; to determine metrics for the sick leave data during a given time interval; to simultaneously model the workplace policies and the metrics for sick leave data to identify correlations among the number of dimensions of data and generalize rules for predicting effective workplace policies; to predict, according to the modeling, a number of effective workplace policies for a particular business entity based on the employment data of the particular business entity; and to generate the communicable disease policy plan for the particular business entity based on the number of effective workplace policies.

Another illustrative embodiment provides a computer program product for generating an employee benefit plan. The computer program product comprises a computer readable storage medium having program instructions embodied therewith. The instructions include program code, stored on the computer-readable storage media, for identifying a number of workplace policies for a plurality of business entities. The workplace policies comprises a number of dimensions of data collected from a number of sources. The instructions include program code, stored on the computer-readable storage media, for collecting employment data for each of the business entities. The employment data includes sick leave data about employees of the plurality of business entities. The instructions include program code, stored on the computer-readable storage media, for determining metrics for the sick leave data during a given time interval. The instructions include program code, stored on the computer-readable storage media, for simultaneously modeling the workplace policies and the metrics for sick leave data to identify correlations among the number of dimensions of data and generalize rules for predicting effective workplace policies. The instructions include program code, stored on the computer-readable storage media, for predicting, according to the modeling, a number of effective workplace policies for a particular business entity based on the employment data of the particular business entity. The instructions include program code, stored on the computer-readable storage media, for generating the communicable disease policy plan for the particular business entity based on the number of effective workplace policies. The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Illustrative embodiments provide a computer-implemented method for generating a generating a communicable disease policy plan by using machine learning. The process identifies a number of workplace policies for a number of business entities. The workplace policies comprise a number of dimensions of data collected from a number of sources. The process collects employment data for each of the business entities. The employment data includes sick leave data about employees of the plurality of business entities. The process determines metrics for the sick leave data during a given time interval. The process simultaneously models the workplace policies and the metrics for the sick leave data to identify correlations among the number of dimensions of data and generalize rules for predicting effective workplace policies. The process predicts, according to the modeling, a number of effective workplace policies for a particular business entity based on the employment data of the particular business entity. The process generates the generating a communicable disease policy plan for the particular business entity based on the number of effective workplace policies.

Figure 1:
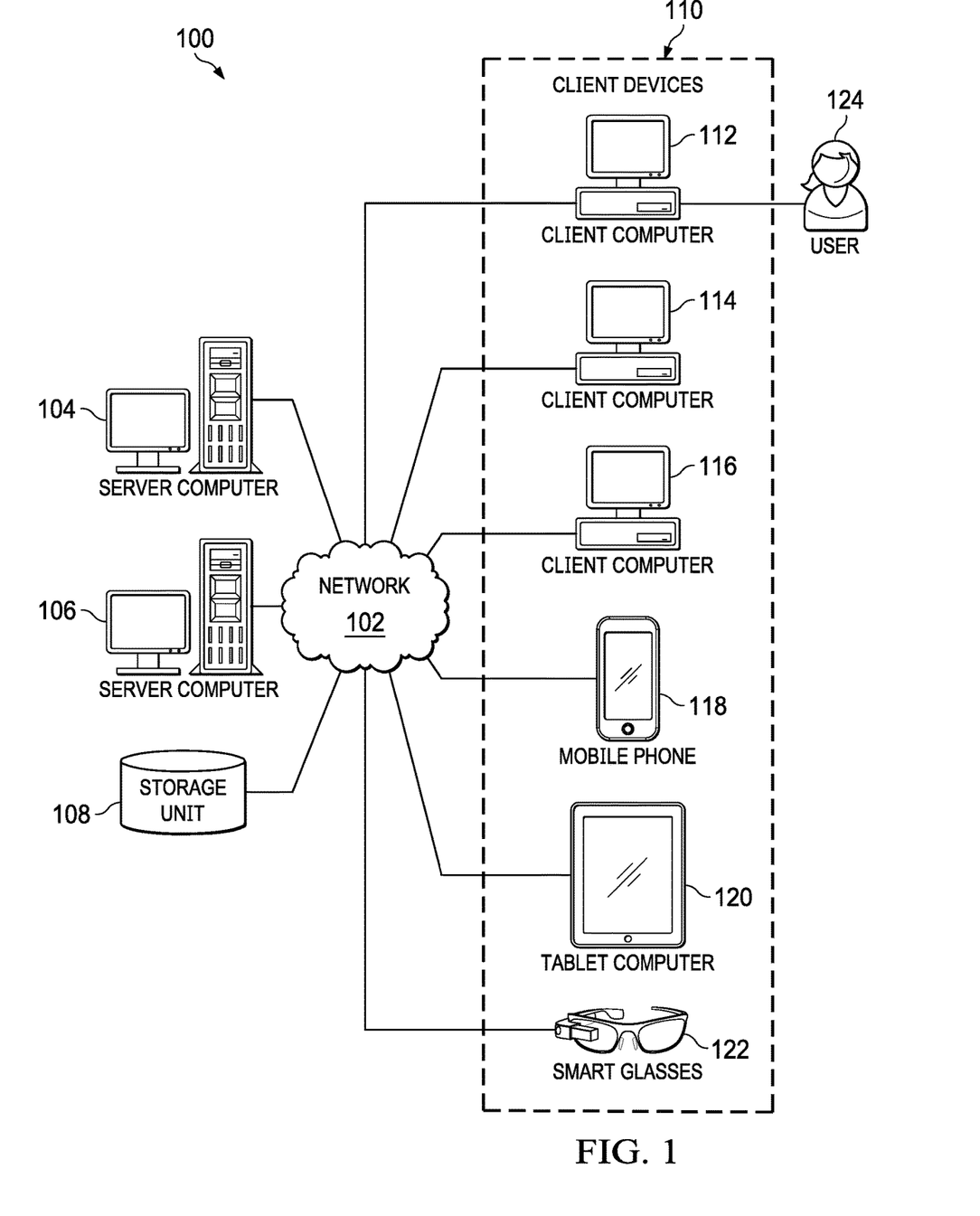
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are client to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

Figure 2:
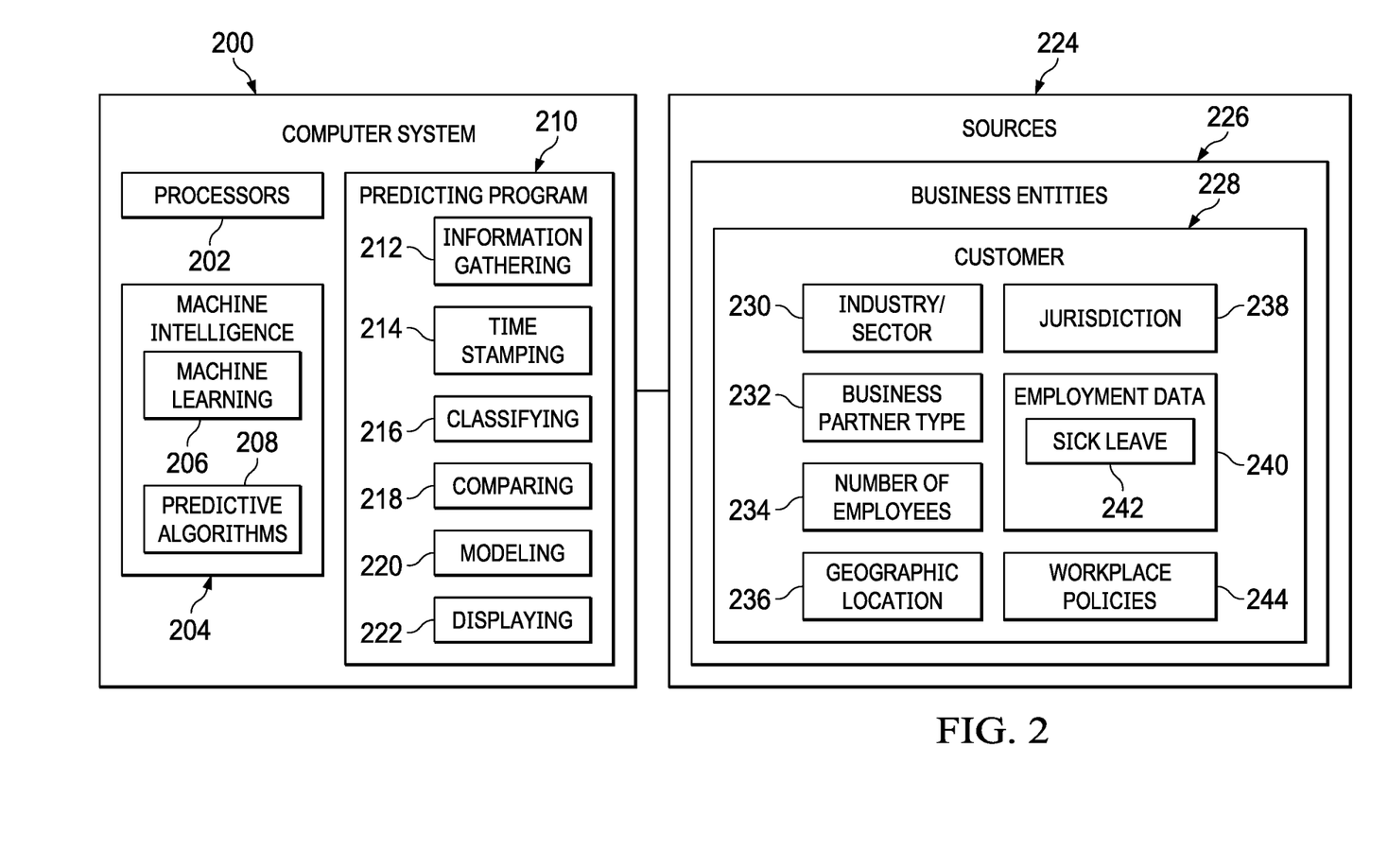
FIG. 2 is an illustration of a block diagram of a computer system for predictive modeling in accordance with an illustrative embodiment.

Turning to FIG. 2, a block diagram of a computer system for predictive modeling is depicted in accordance with an illustrative embodiment. Computer system 200 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, an electronic flight bag, a mobile phone, or some other suitable data processing system.

As depicted, computer system 200 is connected to one or more database 224. Computer system 200 might be an example of server computer 106 in FIG. 1. Similarly, database 224 be implemented in storage such as storage unit 108 in FIG. 1. In other examples, computer system 200 can be more than one computer such as server computer 104 and server computer 106 in FIG. 1.

Database 224 comprises employment data about employees of a plurality of business entities. For example, the employment data can include organizational characteristics about the plurality of business entities. Organizational characteristics can include characteristics such as, but not limited to, a payroll services beginning date, a payroll services ending date, an industry of the organization, a sub-industry of the organization, a geographic region of the organization, a number of employees of the organization, a collection of job codes of the organization, a range of salary amounts of the organization, and a range of part-time to full-time employees of the organization, as well as other suitable characteristics.

The employment data can include data generated in providing services to the one or more employees. For example, the employment data can the data such as, but not limited to, at least one of hiring, benefits administration, payroll, performance reviews, forming teams for new products, assigning research projects, or other data related to services provided to benefit employees. In one illustrative example, the employment data can include sick leave data about the employees.

The employment data can be accessed or aggregated from one or more different source databases. In this manner, database 224 may comprise one or more different databases. In one or more illustrative examples, a database may be maintained by a human capital management service provider, containing client data for the different organizations, benefit plan setup data for services provided by the service provider, employee data collected in providing human capital management services.

In one illustrative example, a database may include human capital management analytics data that relate to employees of different organizations. The data analytics may include, for example, but not limited to, at least one of attrition metrics, stability and experience metrics, employee equity metrics, organization metrics, workforce metrics, and compensation metrics, as well as other relevant metrics.

In one illustrative example, the database may include a number of workplace policies for a plurality of business entities. The workplace policies comprises a number of dimensions of data collected from a number of sources. In one illustrative example, the workplace policies can be identified from one or more of a website of the business entity, and a social media profile of the business entity. The workplace policy can be identified and then stored in the database.

In one illustrative example, the workplace policies may relate to preventing the spread of communicable diseases. For example, the workplace policies may include one or more of wherein the effective workplace policy comprises one of a mandatory minimum sick leave policy, a workplace distancing policy, an employee protective equipment policy, and a workplace cleaning policy.

In this example, computer system 200 comprises information a number of processors 202, machine intelligence 204, and predicting program 210. Machine intelligence 204 comprises machine learning 206 and predictive algorithms 208.

Machine intelligence 204 can be implemented using one or more systems such as an artificial intelligence system, a neural network, a Bayesian network, an expert system, a fuzzy logic system, a genetic algorithm, or other suitable types of systems. Machine learning 206 and predictive algorithms 208 can make computer system 200 a special purpose computer for dynamic predictive modelling.

In an embodiment, processors 202 comprises one or more conventional general-purpose central processing units (CPUs) in computer system 200. When multiple processors are present these processors can be on the same of different computer in computer system 200. In an alternate embodiment, processors 202 comprises one or more graphical processing units (GPUs). Though originally designed to accelerate the creation of images with millions of pixels whose frames need to be continually recalculated to display output in less than a second, GPUs are particularly well suited to machine learning. Their specialized parallel processing architecture allows them to perform many more floating-point operations per second then a CPU, on the order of 100× more. GPUs can be clustered together to run neural networks comprising hundreds of millions of connection nodes. Processors can also comprise a multicore processor, a physics processing unit (PPU), a digital signal processor (DSP), a network processor, or some other suitable type of processor. Further, processors 202 can be homogenous or heterogeneous. For example, processors 202 can be central processing units. In another example, processors 202 can be a mix of central processing units and graphical processing units.

Predicting program 210 comprises information gathering 212, time stamping 214, classifying 216, comparing 218, modeling 220, and displaying 222.

There are three main categories of machine learning: supervised, unsupervised, and reinforcement learning. Supervised machine learning comprises providing the machine with training data and the correct output value of the data. During supervised learning the values for the output are provided along with the training data (labeled dataset) for the model building process. The algorithm, through trial and error, deciphers the patterns that exist between the input training data and the known output values to create a model that can reproduce the same underlying rules with new data. Examples of supervised learning algorithms include regression analysis, decision trees, k-nearest neighbors, neural networks, and support vector machines.

If unsupervised learning is used, not all of the variables and data patterns are labeled, forcing the machine to discover hidden patterns and create labels on its own through the use of unsupervised learning algorithms. Unsupervised learning has the advantage of discovering patterns in the data with no need for labeled datasets. Examples of algorithms used in unsupervised machine learning include k-means clustering, association analysis, and descending clustering.

Whereas supervised and unsupervised methods learn from a dataset, reinforcement learning methods learn from feedback to re-learn/retrain the models. Algorithms are used to train the predictive model through interacting with the environment using measurable performance criteria.

Figure 3:
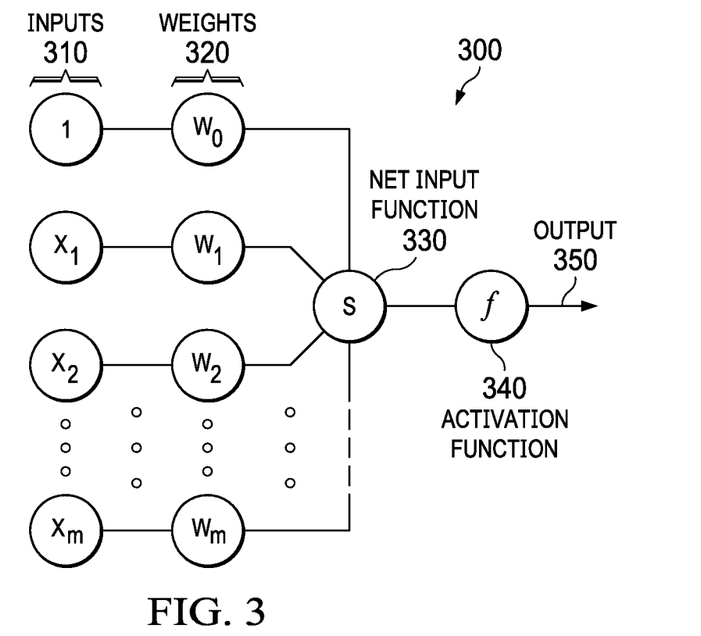
FIG. 3 is a diagram that illustrates a node in a neural network in which illustrative embodiments can be implemented.

FIG. 3 is a diagram that illustrates a node in a neural network in which illustrative embodiments can be implemented. Node 300 might comprise part of machine intelligence 204 in FIG. 2. Node 300 combines multiple inputs 310 from other nodes. Each input 310 is multiplied by a respective weight 320 that either amplifies or dampens that input, thereby assigning significance to each input for the task the algorithm is trying to learn. The weighted inputs are collected by a net input function 330 and then passed through activation function 340 to determine output 350. The connections between nodes are called edges. The respective weights of nodes and edges might change as learning proceeds, increasing or decreasing the weight of the respective signals at an edge. A node might only send a signal if the aggregate input signal exceeds a predefined threshold. Pairing adjustable weights with input features is how significance is assigned to those features with regard to how the network classifies and clusters input data.

Figure 4:
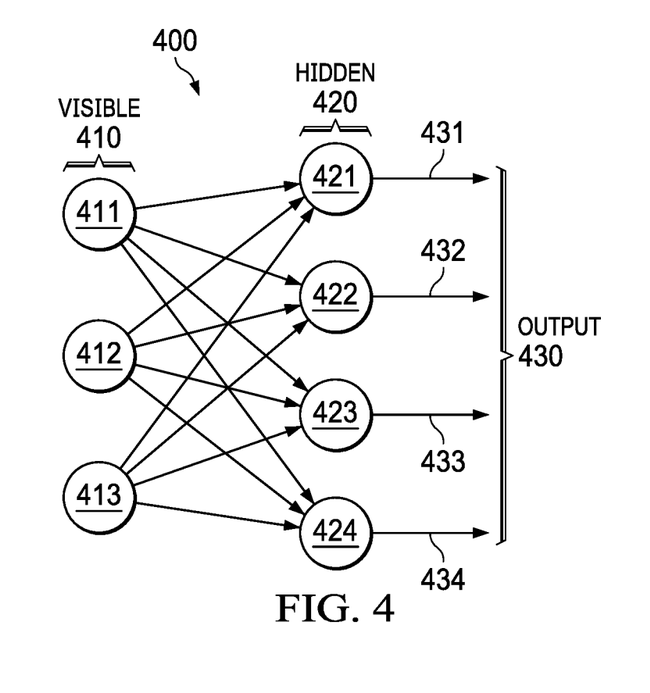
FIG. 4 is a diagram illustrating a neural network in which illustrative embodiments can be implemented.

FIG. 4 is a diagram illustrating a neural network in which illustrative embodiments can be implemented. Neural network 400 might comprise part of machine intelligence 204 in FIG. 2 and is comprised of a number of nodes, such as node 300 in FIG. 3. As shown in FIG. 4, the nodes in the neural network 400 are divided into a layer of visible nodes 410, a hidden layer 420 of hidden nodes, and a layer of node outputs 430. Neural network 400 is an example of a fully connected neural network (FCNN) in which each node in a layer is connect to all of the nodes in an adjacent layer, but nodes within the same layer share no connections.

The visible nodes 410 are those that receive information from the environment (i.e. a set of external training data). Each visible node in layer 410 takes a low-level feature from an item in the dataset and passes it to the hidden nodes in the hidden layer 420. When a node in the hidden layer 420 receives an input value x from a visible node in layer 410 it multiplies x by the weight assigned to that connection (edge) and adds it to a bias b. The result of these two operations is then fed into an activation function which produces the node's output.

For example, when node 421 receives input from all of the visible nodes 411-413, each x value from the separate nodes is multiplied by its respective weight, and all of the products are summed. The summed products are then added to the hidden layer bias, and the result is passed through the activation function to produce output 431. A similar process is repeated at hidden nodes 422-424 to produce respective outputs 432-434. In the case of a deeper neural network, the outputs 430 of hidden layer 420 serve as inputs to the next hidden layer.

The outputs 430 is used to output density parameters. For example, the mean and variance for the Gaussian distribution. Usually, the FCNN is used to produce classification labels or regression values. However, the illustrative embodiments use it directly to produce the distribution parameters, which can be used to estimate the likelihood/probability of output events/time. The illustrative embodiments use the FCNN to output distribution parameters, which are used to generate the communicable disease policy plan.

Training a neural network is conducted with standard mini-batch stochastic gradient descent-based approaches, where the gradient is calculated with the standard back-propagation procedure. In addition to the neural network parameters, which need to be optimized during the learning procedure, there are the weights for different distributions, which also need to be optimized based on the underlying dataset. Since the weights are non-negative, they are mapped to the range [0,1] while simultaneously requiring them summed to be 1.

In machine learning, a cost function estimates how the model is performing. It is a measure of how wrong the model is in terms of its ability to estimate the relationship between input x and output y. This is expressed as a difference or distance between the predicted value and the actual value. The cost function (i.e. loss or error) can be estimated by iteratively running the model to compare estimated predictions against known values of y during supervised learning. The objective of a machine learning model, therefore, is to find parameters, weights, or a structure that minimizes the cost function.

Gradient descent is an optimization algorithm that attempts to find a local or global minima of a function, thereby enabling the model to learn the gradient or direction that the model should take in order to reduce errors. As the model iterates, it gradually converges towards a minimum where further tweaks to the parameters produce little or zero changes in the loss. At this point the model has optimized the weights such that they minimize the cost function.

Neural networks are often aggregated into layers, with different layers performing different kinds of transformations on their respective inputs. A node layer is a row of nodes that turn on or off as input is fed through the network. Signals travel from the first (input) layer to the last (output) layer, passing through any layers in between. Each layer's output acts as the next layer's input.

Neural networks can be stacked to create deep networks. After training one neural net, the activities of its hidden nodes can be used as input training data for a higher level, thereby allowing stacking of neural networks. Such stacking makes it possible to efficiently train several layers of hidden nodes.

A recurrent neural network (RNN) is a type of deep neural network in which the nodes are formed along a temporal sequence. RNNs exhibit temporal dynamic behavior, meaning they model behavior that varies over time.

Figure 5:
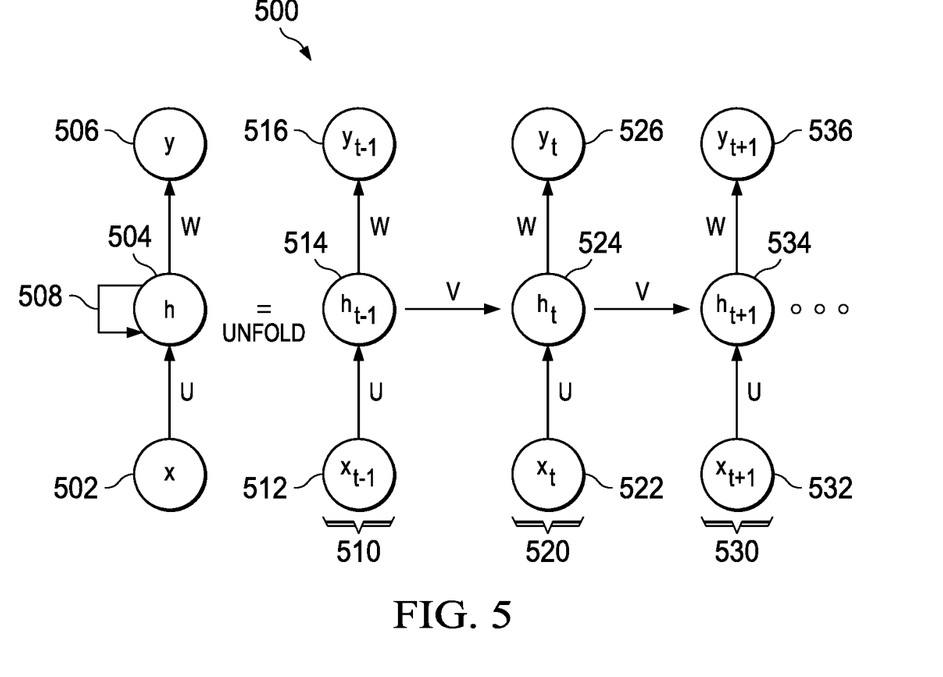
FIG. 5 illustrates an example of a recurrent neural network in which illustrative embodiments can be implemented.

FIG. 5 illustrates an example of a recurrent neural network in which illustrative embodiments can be implemented. RNN 500 might comprise part of machine intelligence 204 in FIG. 2. RNNs are recurrent because they perform the same task for every element of a sequence, with the output being depended on the previous computations. RNNs can be thought of as multiple copies of the same network, in which each copy passes a message to a successor. Whereas traditional neural networks process inputs independently, starting from scratch with each new input, RNNs persistence information from a previous input that informs processing of the next input in a sequence.

RNN 500 comprises an input vector 502, a hidden layer 504, and an output vector 506. RNN 500 also comprises loop 508 that allows information to persist from one input vector to the next. RNN 500 can be "unfolded" (or "unrolled") into a chain of layers, e.g., 510, 520, 530 to write out RNN 500 for a complete sequence. Unlike a traditional neural network, which uses different weights at each layer, RNN 500 shares the same weights U, W, V across all steps. By providing the same weights and biases to all the layers 510, 520, 530, RNN 500 converts the independent activations into dependent activations.

The input vector 512 at time step t−1 is $x_{t-1}$. The hidden state $h_{t-1}$ 514 at time step t−1, which is required to calculate the first hidden state, is typically initialized to all zeroes. The output vector 516 at time step t−1 is $y_{t-1}$. Because of persistence in the network, at the next time step t, the hidden state $h_t$ of the layer 520 is calculated based on the hidden state $h_{t-1}$ 514 and the new input vector $x_t$ 522. The hidden state $h_t$ acts as the "memory" of the network. Therefore, output $y_t$ 526 at time step t depends on the calculation at time step t−1. Similarly, output $y_{t+1}$ 536 at time step t+1 depends on hidden state $h_{t+1}$ 534, calculated from hidden state $h_t$ 524 and input vector $x_{t+1}$ 532.

By employing an RNN, the illustrative embodiments are able to model a communicable disease policy plan for different employers based on policy plans of other relevant entities and changes to those plans over time. For example, illustrative embodiments extract useful static and dynamic features based on different timestamps, which are chained together based on the natural order of timestamps for each customer. Static features (attributes) comprise features that most likely will not change at different timestamps for the same business entity such as, e.g., industry or sector, geographic location, business partner type, etc. Dynamic features comprise features that are likely to change across timestamps for a given business entity. The sequential data (both of descriptive features and outputs) can be fed into an RNN-style model to learn deep representations. For such a representation learning, the illustrative embodiments can stack multiple layers.

Figure 6:
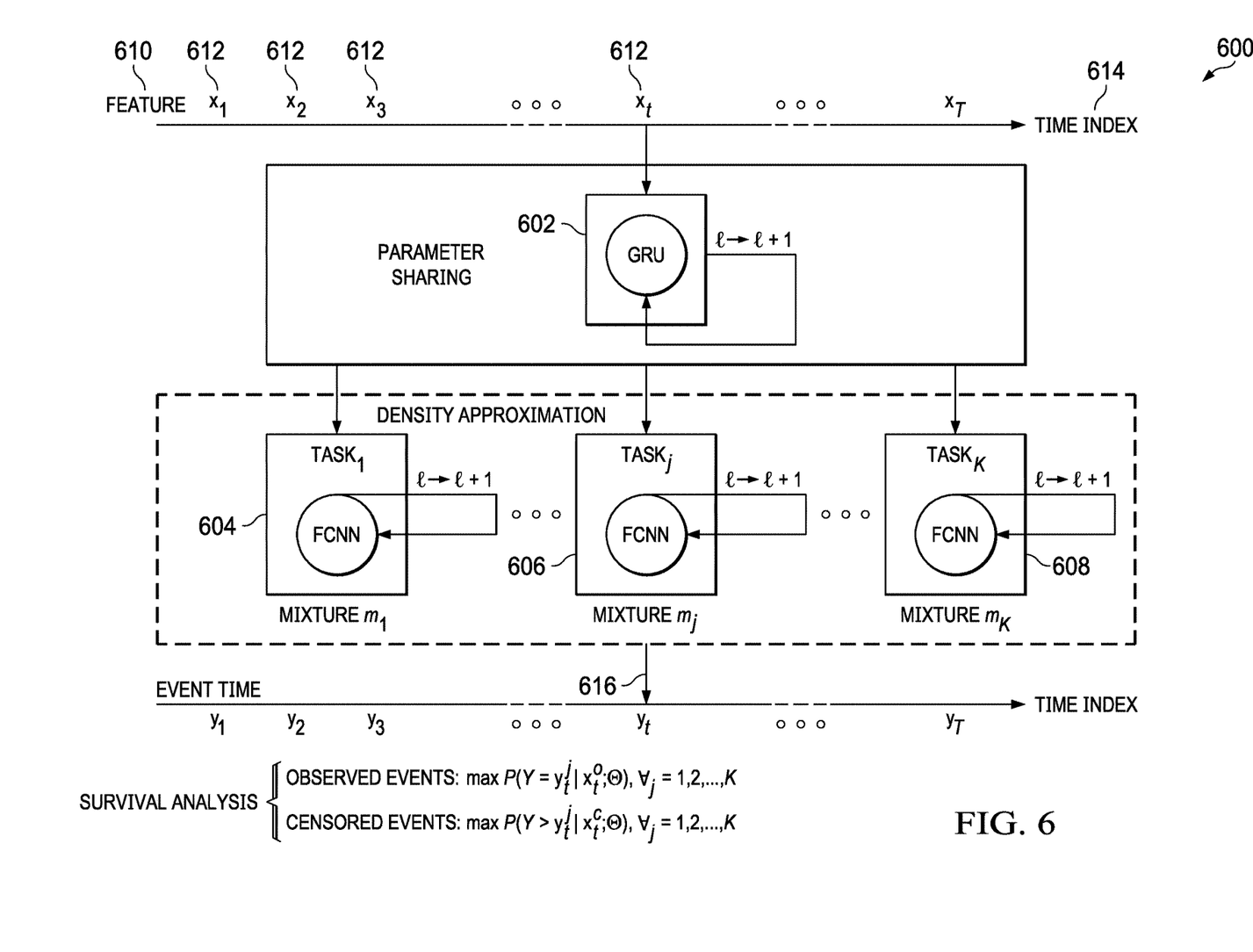
FIG. 6 depicts a multimodal, multi-task deep learning architecture in accordance with illustrative embodiments.

FIG. 6 depicts a multimodal, multi-task deep learning architecture in accordance with illustrative embodiments. Deep learning architecture 600 can be implemented through a combination of RNN 500 in FIG. 5 and neural network 400 in FIG. 4. Deep learning architecture 600 might be an example implementation of machine intelligence 204 in FIG. 2.

Deep learning architecture 600 comprises RNN 602 and three FCNN layer groups 604, 606, 608. By using multiple FCNN layer groups 604, 606, 608 on top of the RNN 602 layers, deep learning architecture 600 can approximate the density (distribution) of an event time. In particular, RNN 602 outputs the density parameters (e.g., mean and variance for the Gaussian distribution, or scale and shape parameters for the Weibull distribution). One simple distribution might not fit the underlying data very well. Therefore, illustrative embodiments can use a weighted combination of basis distributions to form the final output distribution. For the combination method, the illustrative embodiments can use the arithmetic average or geometric average. Once the density parameters are induced/outputted, the probability or density function for any given time can be computed, which is how the labeled sequence is used to compute the likelihood (or losses) to do backpropagation.

Multi-task learning can be used to predict a number of effective policies for an communicable disease policy plan of a particular business entity. In addition to classifying predicted changes over the different change categories, the multi-task learning can address the problem of forecasting effective communicable disease policies. Based on the prediction/monitoring, for each business entity, the illustrative embodiments can predict a number of effective policies based on identified trends within the communicable disease policy plan and the employment data of the particular business entity, along with certain static attributes. The static attributes (features) such as, e.g., industry or sector, geographic location, jurisdiction, etc., can be used to segment or group business entities. Business entities that share static attributes are likely to have similar behaviors.

Input into deep learning architecture 600 comprises dynamic feature values 610 extracted at different timestamps 612 $x_1, x_2, x_3, x_t$ along a time index 614. The time intervals between timestamps 612 might be daily, weekly, monthly, etc.

The whole dataset used by RNN 602 represents changes to the communicable disease policy plan across all business entities within a time period. Each output only indicates a predicted change for a particular customer based on the observed data. However, prediction and inference of effective policies for a given business entity relies both on past behavior of that business entity as well as change behavior of similar businesses. These (defined by shared static features). Therefore, the prediction output is an intelligent decision encoded with all changes across all events in the dataset.

In an illustrative embodiment, RNN 602 might comprise three layers (not shown). However, more layers can be used if needed. Each layer feeds into the next (similar to that shown in FIG. 5), denoted l→l+1 in FIG. 6. Within each RNN layer, the output of the previous timestamp is used as input for the next timestamp in the temporal sequence.

Deep learning architecture 600 comprises separate FCNN layer groups for each predicted effective policy. In the present example, three possible policy changes are depicted. Therefore, there are three FCNN layer groups 604, 606, 608, one for each policy change. Each FCNN might comprise multiple fully connected layers, as shown for example in FIG. 4.

RNN 602 shares all predicted change events to learn common representation. Then for each type of change event, an independent FCNN is used to learn how to make the prediction. A density/distribution modeling/approximation is attached to each FCNN layer groups 604, 606, 608. Specifically, density will output the density parameter(s). Assuming the output time sequence from RNN 602 follows the normal distribution, which has a mean parameter and a variance parameter, FCNN layer groups 604, 606, 608 can compute any probability density/distribution function or likelihood given any test time.

The final output vector 616 comprises a mixture of multiple distributions to determine the effective policy that captures the event information. In addition to a normal distribution there might also be Weibull distribution, an exponential distribution, etc. These probability density functions are combined together to produce one final weighted average. Each distribution will have a weight, which is determined automatically during the learning stage. The weighting is for each policy. Using the example above, for FCNN 604 there will be multiple distributions for a particular policy change attached with different weights. For FCNN 606, as well as with FCNN 608, there will be a similar kind of mixture behavior for the associated policy change.

Figure 7:
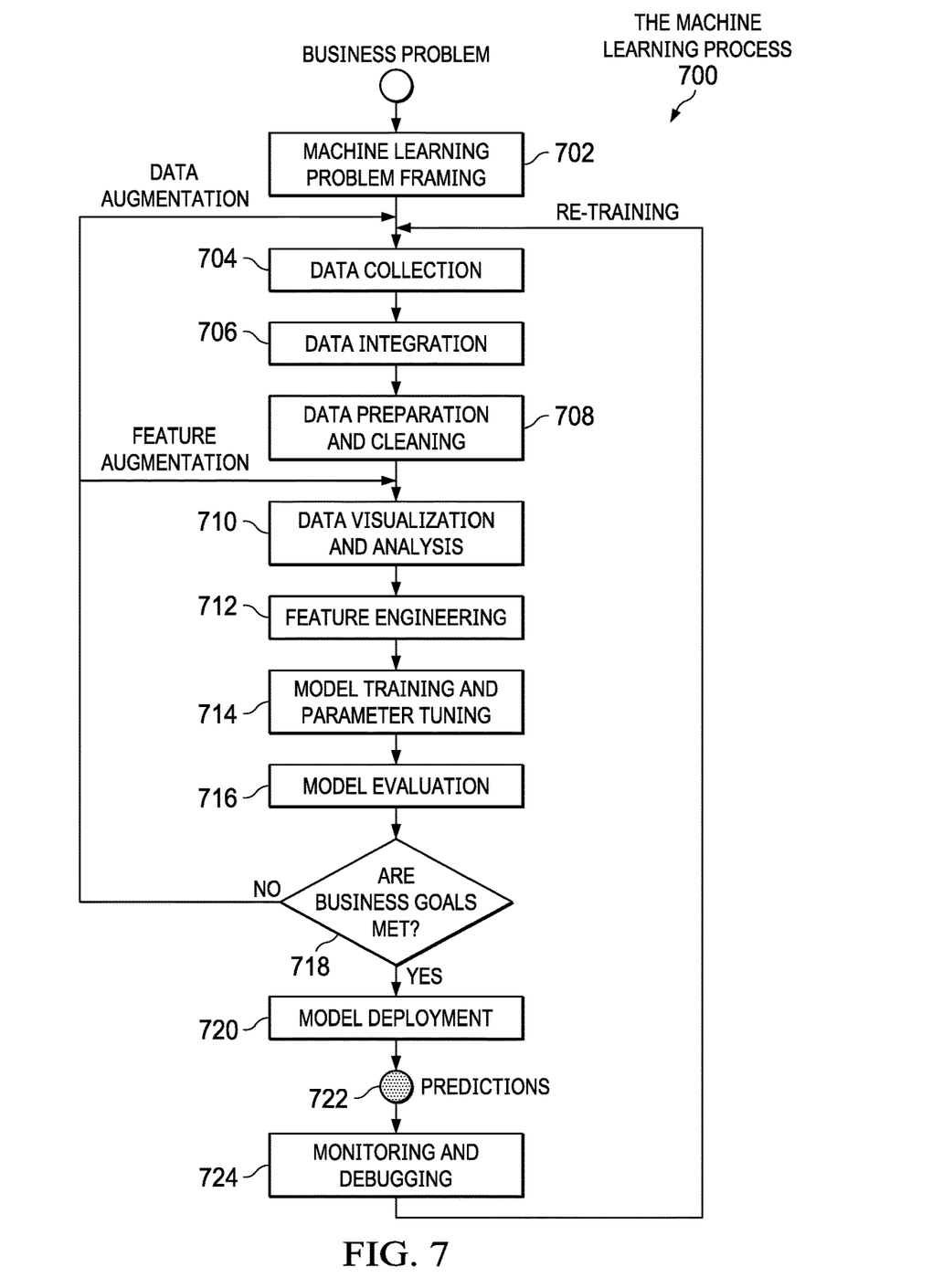
FIG. 7 depicts a flowchart illustrating a process for machine learning in accordance with illustrative embodiments.

FIG. 7 depicts a flowchart illustrating a process for machine learning in accordance with illustrative embodiments. Process 700 might be an example implementation of machine learning 206 in FIG. 2. Process 700 begins with framing the machine learning problem (step 702). For example, the machine learning problem might be generating a communicable disease policy plan.

Data collection (step 704), data integration (step 706), and data preparation and cleaning (step 708) gather and organize the dataset of employment data and events used for machine learning.

After data preparation, process 700 proceeds to data visualization and analysis (step 710). This visualization might comprise a table, as well as other organizational schemes. Next, feature engineering is used to determine the features likely to have to the most predictive value (step 712).

The predictive model is then trained and tuned (step 714). This training might be carried out using a deep learning architecture such as deep learning architecture 600 in FIG. 6. The model is then evaluated for accuracy (step 716) and a determination is made as to whether the model meets the business goals (step 718). If the model fails the evaluation, process 700 might return to steps 704 and/or 710.

Once the model meets the business goals, it is ready for deployment (step 720). Predictions 722 made during normal operation are used for monitoring and debugging the model as a process of continuous re-training and refinement (step 724).

Figure 8:
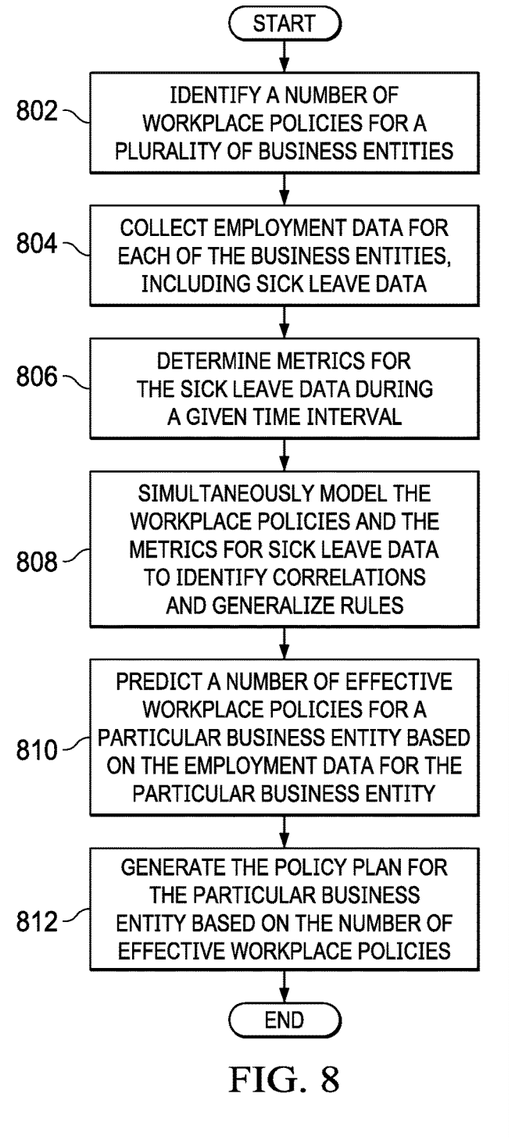
FIG. 8 depicts a flowchart for a process of predicting changes in employee benefits and generating an employee benefit plan in accordance with illustrative embodiments.

FIG. 8 depicts a flowchart for generating a generating a communicable disease policy plan in accordance with illustrative embodiments. Process 800 can be implemented using the computer systems and neural networks shown in FIGS. 2 and 6, for example.

Process 800 begins by identifying a number of workplace policies for a plurality of business entities (step 810). The workplace policies comprise a number of dimensions of data collected from a number of sources. The workplace policies comprise one or more policies related to preventing the spread of communicable diseases. For example, the workplace policy can include one or more of a mandatory minimum sick leave policy, a workplace distancing policy, an employee protective equipment policy, and a workplace cleaning policy.

Process 800 collects employment data for each of the business entities (step 820). The employment data includes sick leave data about employees of the plurality of business entities. The employment data might comprise data about the business entities, static features/attributes of a business entity, dynamic features of a business entity, and timestamps of the dynamic features. The sick leave data may be identified and aggregated at the employer level to protect health information privacy rights of the individual employees.

The process 800 determines metrics for the sick leave data during a given time interval (step 830). These metrics capture the amount of employee activity with regard to the sick leave data provided by the different business entities. In other words, how much are employees of the business entities taking sick leave in the time interval, as well as the amount of sick leave taken before the employee returns to work. In one illustrative example, the metrics comprise a normalized sick leave score calculated from the sick leave data. In one illustrative example, the business entities are grouped according to a number of shared static features.

Using the identified workplace policies and the sick leave metrics, process 800 simultaneously models the workplace policies and the metrics for sick leave data to identify correlations among the dimensions of data and generalize rules for predicting effective workplace policies (step 840). In this example, the modeling in step 840 can be performed using multimodal multi-task learning such as that shown in FIGS. 6 and 7. In one illustrative example, a separate fully connected neural network calculates the probability density function for each effective workplace policy.

Based on this modeling, process 800 is able to predict the policy plan for the particular business entity based on the number of effective workplace policies (step 850). In one illustrative example, effective workplace policies for of the particular business entity are predicted based on employment data of the particular business entity and employment data of a number of other business entities sharing specified static features.

Process 800 generates the generating a communicable disease policy plan for the particular business entity based on the number of effective workplace policies (step 860). After this, process 800 ends.

Figure 9:
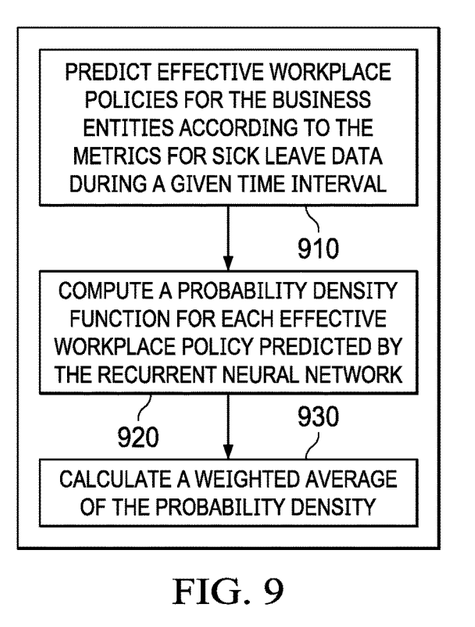
FIG. 9 depicts a flowchart for modeling the workplace policies and the metrics for sick leave data is depicted according to an illustrative embodiment.

Turning next to FIG. 9, a flowchart for modeling the workplace policies and the metrics for sick leave data is depicted according to an illustrative embodiment. Process 900 is an example of process step 840 shown in block form in FIG. 8.

Using a recurrent neural network, the process predicts effective workplace policies for the business entities according to the metrics for the sick leave data during a given time interval (step 910). Using a number of fully connected neural networks, the process computes a probability density function for each effective workplace policy predicted by the recurrent neural network (step 920). The process calculates a weighted average of the probability density functions (step 930). Thereafter, the process can continue to step 850 of process 800 shown in FIG. 8.

Figure 10:
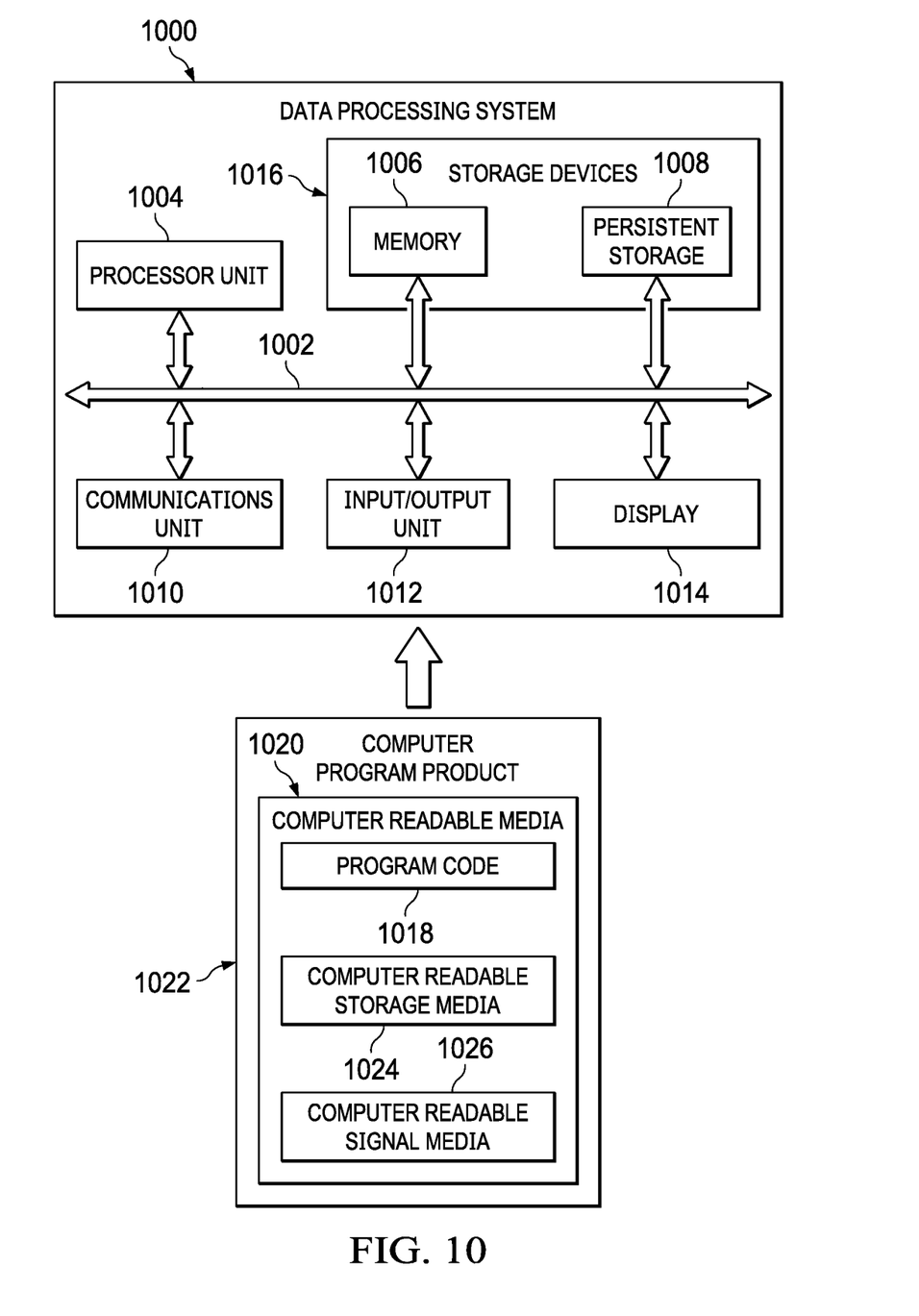
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement one or more server computers and client computers in network data processing system 100 of FIG. 1. In this illustrative example, data processing system 1000 includes communications framework 1002, which provides communications between processor unit 1004, memory 1006, persistent storage 1008, communications unit 1010, input/output unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation. In an embodiment, processor unit 1004 comprises one or more conventional general-purpose central processing units (CPUs). In an alternate embodiment, processor unit 1004 comprises one or more graphical processing units (CPUs).

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Storage devices 1016, in these examples, may be, for example, a random access memory or any other suitable volatile or non-volatile storage device. Persistent storage 1008 may take various forms, depending on the particular implementation.

The term "non-transitory" or "tangible", as used herein, is a limitation of the medium itself (i.e., tangible, not a signal) as opposed to a limitation on data storage persistency (e.g., RAM vs. ROM).

For example, persistent storage 1008 may contain one or more components or devices. For example, persistent storage 1008 may be a hard drive, a flash memory, a rewritable optical disk, a rewritable magnetic tape, or some combination of the above. The media used by persistent storage 1008 also may be removable. For example, a removable hard drive may be used for persistent storage 1008. Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer-usable program code, or computer-readable program code that may be read and executed by a processor in processor unit 1004. The program code in the different embodiments may be embodied on different physical or computer-readable storage media, such as memory 1006 or persistent storage 1008.

Program code 1018 is located in a functional form on computer-readable media 1020 that is selectively removable and may be loaded onto or transferred to data processing system 1000 for execution by processor unit 1004. Program code 1018 and computer-readable media 1020 form computer program product 1022 in these illustrative examples. In one example, computer-readable media 1020 may be computer-readable storage media 1024 or computer-readable signal media 1026.

In these illustrative examples, computer-readable storage media 1024 is a physical or tangible storage device used to store program code 1018 rather than a medium that propagates or transmits program code 1018. Alternatively, program code 1018 may be transferred to data processing system 1000 using computer-readable signal media 1026.

Computer-readable signal media 1026 may be, for example, a propagated data signal containing program code 1018. For example, computer-readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

The illustrative embodiments provide computer-implemented method for generating a policy plan by using machine learning. The process identifies a number of workplace policies for a number of business entities. The workplace policies comprise a number of dimensions of data collected from a number of sources. The process collects employment data for each of the business entities. The employment data includes sick leave data about employees of the plurality of business entities. The process determines metrics for the sick leave data during a given time interval. The process simultaneously models the workplace policies and the metrics for the sick leave data to identify correlations among the number of dimensions of data and generalize rules for predicting effective workplace policies. The process predicts, according to the modeling, a number of effective workplace policies for a particular business entity based on the employment data of the particular business entity. The process generates the policy plan for the particular business entity based on the number of effective workplace policies.

By predicting both the effective policies and the trending changes among those policies, the illustrative embodiments allow proactive steps to be taken to assist a business entity in making changes to ameliorate the spread of a communicable disease. The anticipatory, proactive steps can provide cost and time savings for both business entities, as well as providing public health benefits.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method generating a communicable disease policy plan, the method comprising:
identifying, by a computer system, a number of workplace policies for a plurality of business entities, wherein the workplace policies comprises a number of dimensions of data collected from a number of sources;
collecting, by the computer system, employment data for each of the business entities, the employment data including sick leave data about employees of the plurality of business entities;
extracting, by the computer system, static features and dynamic features from the employment data based on different timestamps for the plurality of business entities;
identifying, by the computer system, entity behaviors based on share static features of different business entities to group business entities from the plurality of business entities;
determining, by the computer system, metrics for the sick leave data during a given time interval;
simultaneously modeling, by the computer system, the workplace policies and the metrics for sick leave data to identify correlations among the number of dimensions of data and generalize rules for predicting effective workplace policies, wherein the modeling outputs a vector comprising weighted averages for each policy of the number of workplace policies;
wherein modeling the workplace policies and the metrics for sick leave data comprises: predicting, with a recurrent neural network, effective workplace policies for the business entities according to the metrics for the sick leave data during a given time interval;
computing, with a number of fully connected neural networks, a probability density function for each effective workplace policy predicted by the recurrent neural network;
calculating a weighted average of the probability density functions;
training, by the computer system, a predictive model by performing iterative analysis based on machine learning with a training data comprises the vector of weighted averages, the entity behaviors, and the dynamic features, wherein the iterative analysis is performed with predictive algorithms and wherein the machine learning comprises at least one of supervised learning, unsupervised learning, and reinforcement learning;
predicting, by the computer system according to the predictive model, a number of effective workplace policies for a particular business entity based on the employment data of the particular business entity; and
generating, by the computer system, the communicable disease policy plan for the particular business entity based on the number of effective workplace policies; and retraining, by the computer system, the predictive model using machine learning incorporating the number of effective workplace policies.

2. The method of claim 1, wherein a separate fully connected neural network calculates the probability density function for each effective workplace policy.

3. The method of claim 1, wherein the effective workplace policy comprises one of a mandatory minimum leave policy, a workplace distancing policy, an employee protective equipment policy, and a workplace cleaning policy.

4. The method of claim 1, wherein metrics comprises a normalized sick leave score.

5. The method of claim 1, wherein business entities are grouped according to a number of shared static features.

6. The method of claim 5, wherein predicting number of effective workplace policies for of the particular business entity is based on employment data of the particular business entity and employment data of a number of other business entities sharing specified static features.

7. A computer system for generating a communicable disease policy plan, the computer system comprising:
a bus system;
a storage device connected to the bus system, wherein the storage device stores program instructions; and
a number of processors connected to the bus system, wherein the number of processors execute the program instructions:
to identify a number of workplace policies for a plurality of business entities, wherein the workplace policies comprises a number of dimensions of data collected from a number of sources;
to collect employment data for each of the business entities, the employment data including sick leave data about employees of the plurality of business entities;
to extract static features and dynamic features from the employment data based on different timestamps;
to identify, entity behaviors based on share static features of different business entities to group business entities from the plurality of business entities;
to determine metrics for the sick leave data during a given time interval;
to simultaneously model the workplace policies and the metrics for sick leave data to identify correlations among the number of dimensions of data and generalize rules for predicting effective workplace policies, wherein the modeling outputs a vector comprising weighted averages for each policy of the number of workplace policies;
wherein modeling the workplace policies and the metrics for sick leave data comprises the number of processors further executing the program instructions:
to predict, with a recurrent neural network, effective workplace policies for the business entities according to the metrics for the sick leave data during a given time interval;
to compute, with a number of fully connected neural networks, a probability density function for each effective workplace policy predicted by the recurrent neural network;
to calculate a weighted average of the probability density functions;
to predict, according to the predictive model, a number of effective workplace policies for a particular business entity based on the employment data of the particular business entity;

to generate the communicable disease policy plan for the particular business entity based on the number of effective workplace policies;
    to train a predictive model by performing iterative analysis based on machine learning with a training data comprises the vector of weighted averages, the entity behaviors, and the dynamic features, wherein the iterative analysis is performed with predictive algorithms and wherein the machine learning comprises at least one of supervised learning, unsupervised learning, and reinforcement learning; and
    to retrain the predictive model using machine learning incorporating the number of effective workplace policies.

8. The computer system of claim 7, wherein a separate fully connected neural network calculates the probability density function for each effective workplace policy.

9. The computer system of claim 7, wherein the effective workplace policy comprises one of a mandatory minimum leave policy, a workplace distancing policy, an employee protective equipment policy, and a workplace cleaning policy.

10. The computer system of claim 7, wherein metrics comprises a normalized sick leave score.

11. The computer system of claim 7, wherein business entities are grouped according to a number of shared static features.

12. The computer system of claim 11, wherein predicting number of effective workplace policies for of the particular business entity is based on employment data of the particular business entity and employment data of a number of other business entities sharing specified static features.

13. A computer program product for generating a communicable disease policy plan, the computer program product comprising:
    a computer-readable storage media; program code, stored on the computer-readable storage media, for identifying a number of workplace policies for a plurality of business entities, wherein the workplace policies comprises a number of dimensions of data collected from a number of sources;
    program code, stored on the computer-readable storage media, for collecting employment data for each of the business entities, the employment data including sick leave data about employees of the plurality of business entities; program code, stored on the computer-readable storage media, for extracting static features and dynamic features from the employment data based on different timestamps;
    program code, stored on the computer-readable storage media, for identifying entity behaviors based on share static features of different business entities to group business entities from the plurality of business entities;
    program code, stored on the computer-readable storage media, for determining metrics for the sick leave data during a given time interval;
    program code, stored on the computer-readable storage media, for simultaneously modeling the workplace policies and the metrics for sick leave data to identify correlations among the number of dimensions of data and generalize rules for predicting effective workplace policies, wherein the modeling outputs a vector comprising weighted averages for each policy of the number of workplace policies;
    wherein the program code for modeling the workplace policies and the metrics for sick leave data comprises: program code for predicting effective workplace policies for the business entities according to the metrics for the sick leave data during a given time interval;
    program code for computing, with a number of fully connected neural networks, a probability density function for each effective workplace policy predicted by the recurrent neural network;
    program code for calculating a weighted average of the probability density functions;
    program code, stored on the computer-readable storage media, for training a predictive model by performing iterative analysis based on machine learning with a training data comprises the vector of weighted averages, the entity behaviors, and the dynamic features, wherein the iterative analysis is performed with predictive algorithms and wherein the machine learning comprises at least one of supervised learning, unsupervised learning, and reinforcement learning;
    program code, stored on the computer-readable storage media, for predicting, according to the predictive model, a number of effective workplace policies for a particular business entity based on the employment data of the particular business entity;
    program code, stored on the computer-readable storage media, for generating the communicable disease policy plan for the particular business entity based on the number of effective workplace policies; and
    program code, stored on the computer-readable storage media, for retraining the predictive model using machine learning incorporating the number of effective workplace policies.

14. The computer program product of claim 13, wherein a separate fully connected neural network calculates the probability density function for each effective workplace policy.

15. The computer program product of claim 13, wherein the effective workplace policy comprises one of a mandatory minimum leave policy, a workplace distancing policy, an employee protective equipment policy, and a workplace cleaning policy.

16. The computer program product of claim 13, wherein metrics comprises a normalized sick leave score.

17. The computer program product of claim 13, wherein business entities are grouped according to a number of shared static features.

18. The computer program product of claim 17, wherein predicting number of effective workplace policies for of the particular business entity is based on employment data of the particular business entity and employment data of a number of other business entities sharing specified static features.

\* \* \* \* \*